Oct. 4, 1960 G. H. SCHACHT 2,955,168

CROSS BAR SWITCH

Filed Dec. 26, 1957 6 Sheets-Sheet 1

INVENTOR.

GUNTER H. SCHACHT

BY C. A. Gulbrandsen

ATTY.

INVENTOR.
GUNTER H. SCHACHT
BY C. A. Bullbrandsen
ATTY.

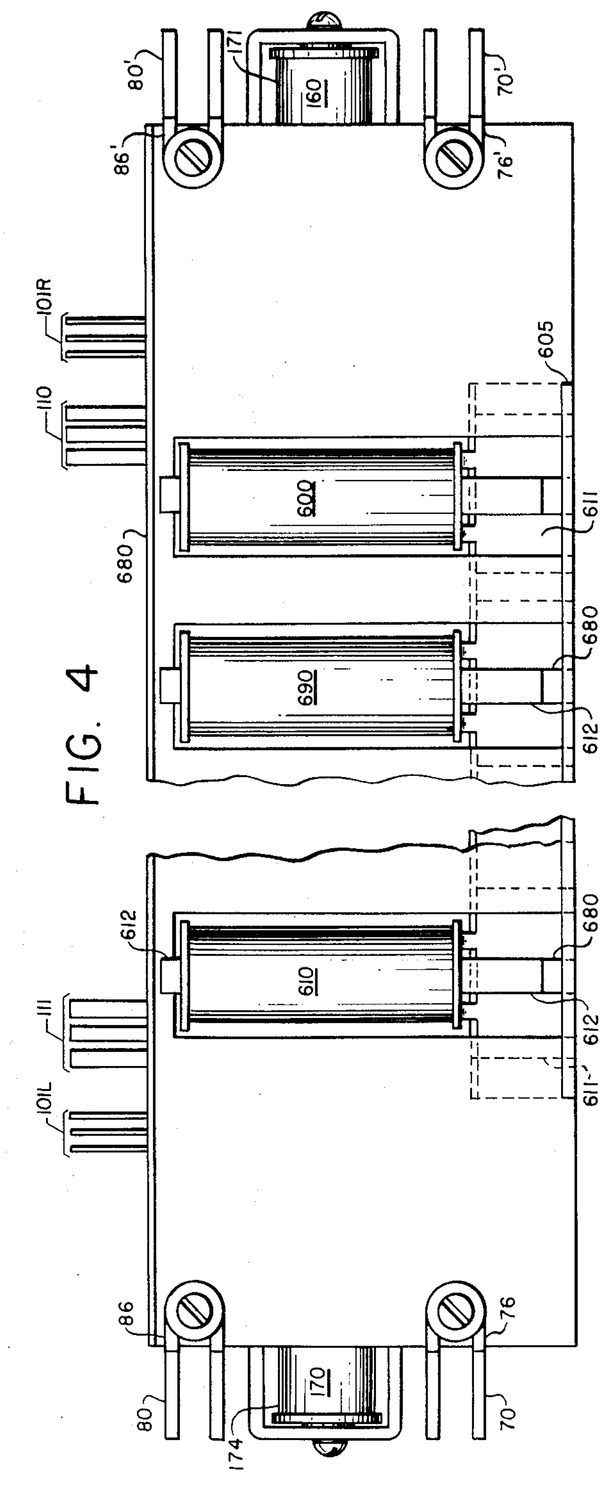
FIG. 4
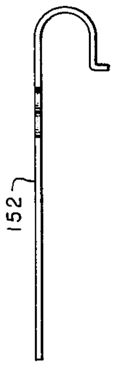
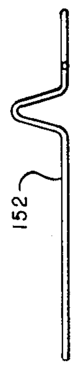
FIG. 5
FIG. 6
INVENTOR.
GUNTER H. SCHACHT
BY C. A. Gullbrandsen
ATTY.

Oct. 4, 1960 G. H. SCHACHT 2,955,168

CROSS BAR SWITCH

Filed Dec. 26, 1957 6 Sheets-Sheet 4

INVENTOR.
GUNTER H. SCHACHT

BY
C. A. Gullbrandsen
ATTY.

Oct. 4, 1960 G. H. SCHACHT 2,955,168

CROSS BAR SWITCH

Filed Dec. 26, 1957 6 Sheets-Sheet 5

INVENTOR.
GUNTER H. SCHACHT
BY
C. A. Gulbrandsen
ATTY.

Oct. 4, 1960 G. H. SCHACHT 2,955,168
CROSS BAR SWITCH
Filed Dec. 26, 1957 6 Sheets-Sheet 6

INVENTOR.
GUNTER H. SCHACHT
BY
C. A. Gullbrandsen
ATTY.

United States Patent Office 2,955,168

Patented Oct. 4, 1960

2,955,168

CROSS BAR SWITCH

Gunter H. Schacht, Vestal, N.Y., assignor to Automatic Electric Laboratories, Inc., a corporation of Delaware Filed Dec. 26, 1957, Ser. No. 705,427

10 Claims. (Cl. 179—27.54)

This invention relates to crossbar switches and more particularly to those adapted for use in telephone systems.

The apparatus as shown herein constitutes an improvement over the switch shown in copending application 546,967, now Patent No. 2,917,587, filed November 15, 1955, by K. W. Graybill et al. The switches in both inventions therefore, have many features in common and are generally similar in basic construction. In mode of operation and specific details, the present invention differs from that of Graybill.

The switches in both inventions have five horizontal levels. Each level has a relay at either end, each relay capable of preparing the operation of a plurality of separate sets of contacts. Each of the switches has also ten cross-operating relays for completing the cross point connection. Each of these switches utilizes a ribbon-like ladder between the opposite end relays of a level to control the preparatory movement. The contactors of a level are generally identical for both of these switches and both are arranged in two tiers or layers. Both switches use a bare wire bank multiple, each level having two tiers secured to the base plate of the level.

In the switch shown in the present invention the following construction characteristics will be evident. Each level is constructed on a solid flat base plate. The level or horizontal relays do not employ the conventional type of armature. These relays employ an external holding member in which the vertically mounted flat plate armature is restrained. Each armature is biased inwardly toward the level by means of a connection to the ladder-like ribbon actuating member for that level. Energization of one of the relays of a level horizontally shifts the ribbon. One of each of a plurality of pairs of formed wire springs is displaced horizontally due to this shift, a first set being displaced on a shift to the right and a second set on a shift to the left. Each of the sets of wire springs on displacement prepares a separate set of contactors for closure.

The cross-operating or vertical relays are also mounted horizontally to a flat base plate, this being the uppermost or sixth plate of the switch. A stepped armature is attracted to an energized relay to push a notched rod downward. The notches engage any displaced spring to free a particular set of contactors. The contactors are biased toward the bank multiple and when freed actually engage the bank and maintain the engagement due to the tensioning of the contactor spring. The engaged condition may be maintained after release of the horizontal relay as long as the vertical relay remains operated.

Each of the five levels has two directions of optional movement which totals ten options. Ten cross-operating members are utilized so that a total of 100 cross points is achieved. Each cross point has six separate contactors, three to a set so that by an odd-even discrimination, 200 three-wire connections may be made.

An object of the invention is to provide a novel crossbar switch.

A further object of the invention consists in the use of a series of horizontal flat plates mounted in ladderlike fashion which are readily demountable.

A feature of the invention consists in the use of formed wire springs as the heart of the movement. The springs are first actuated in a horizontal direction and then, the selected one is moved in a vertical direction to cause the contacting armature springs to move.

A further feature of the invention consists in the use of a notched rod which is actuated on operation of the vertical magnets to engage the indicated wire spring and free the contactors to close circuits to the bare wire multiple.

A further feature consists in the use of biased contactor springs so that the actuating plates are moved away from the contactors on actuation, allowing the contactor springs to utilize their own spring tension to contact the bank multiple.

Referring to the drawings, Fig. 1 shows a representative side view of the switch. Of the five levels of the switch, but two have been shown, the other levels being duplicates of those shown.

Fig. 4 shows a top view of the vertical actuating or cross connect relays.

Figs. 5 and 6 show two views of a horizontal actuating spring.

Figure 1:
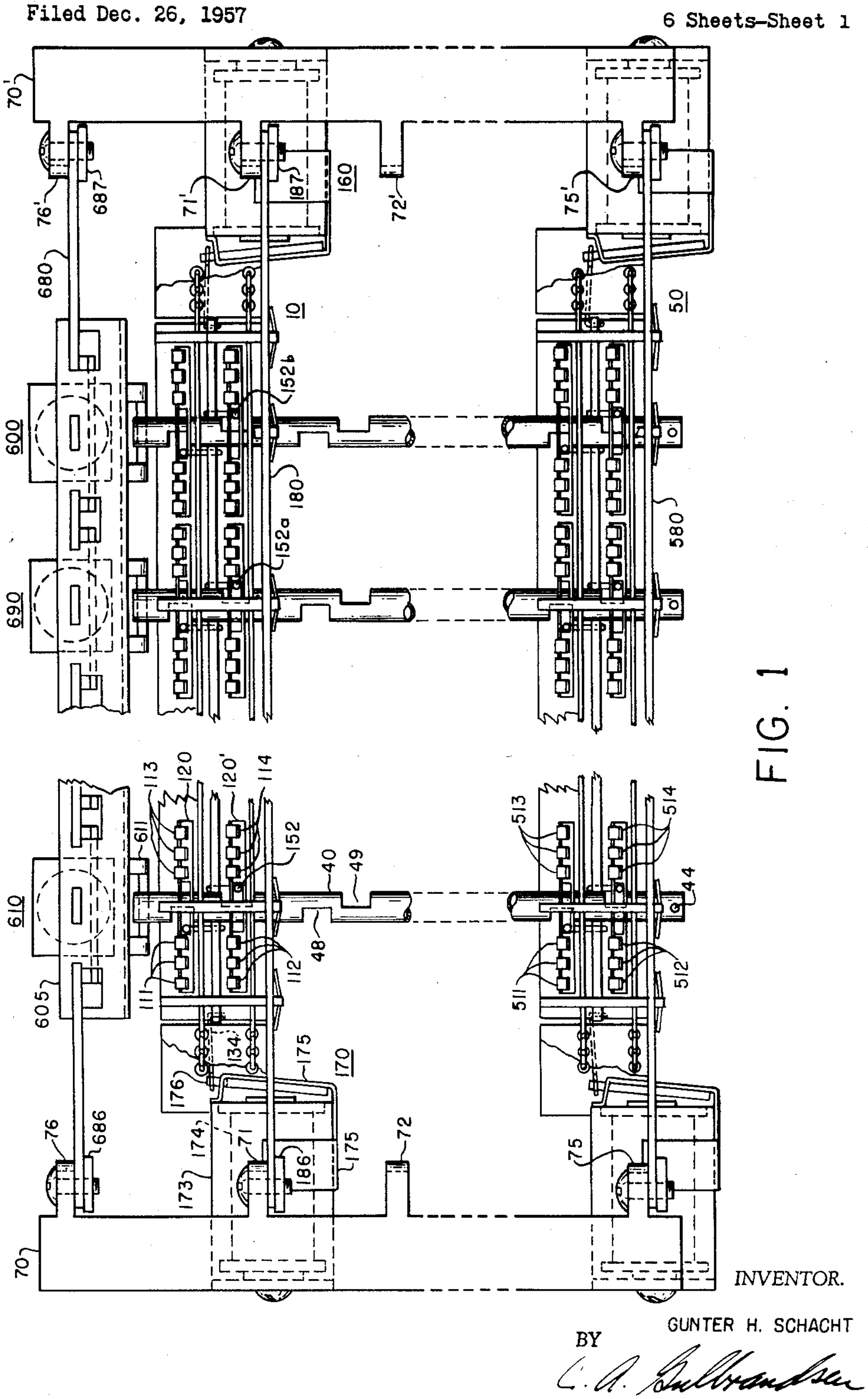
Figure 2:
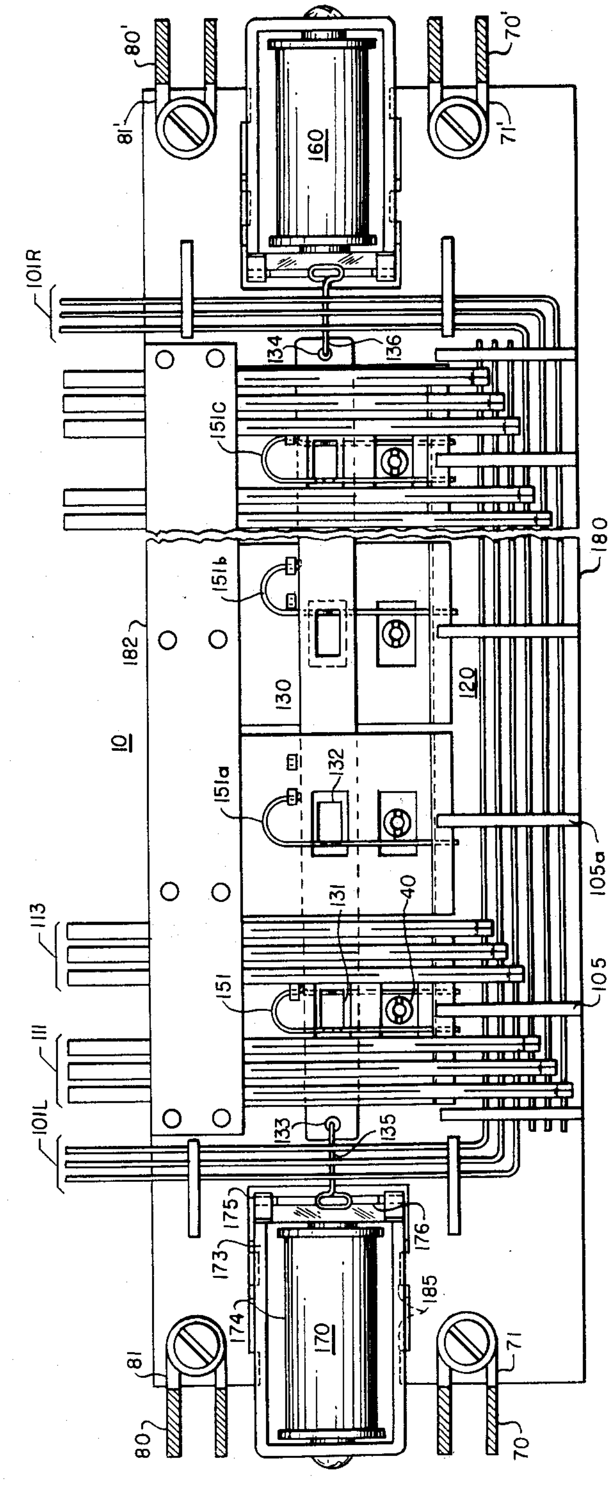
Fig. 2 shows a top view of a representative level of the switch.

Fig. 1 shows a partial view of the switch structure. Shown are two levels 50 and 10 of the five contact levels required for the entire switch. Each contact level is for all practical purposes identical to the remaining contact levels so that no purpose would be achieved by showing all the levels. Also shown at the top of Fig. 1 is a mounting plate 680 bearing the vertical actuating or cross-operating relays such as 610 . . . to 690 and 600. All six plates are held together by means of ladder-like corner supports such as 70. Each of these corner supports such as 70 is composed of a pair of parallel bars connected together by six U-shaped rungs such as 75, 72, 71 and 76. Each of the rungs is designed to hold a corner of base plate (the five levels and the cross-connect relay plate). A top view of these supports is shown in Figs. 2 and 4. A support rung is placed above each of the four corners for mounting. Each of the base plates has fastened to its lower surface at each corner a tapped emboss such as 686 and 186. These embosses accommodate the screws which secure the plates to the corner support rungs in a manner shown. By the use of this construction, levels are easily mounted, demounted and interchanged.

Figure 7:
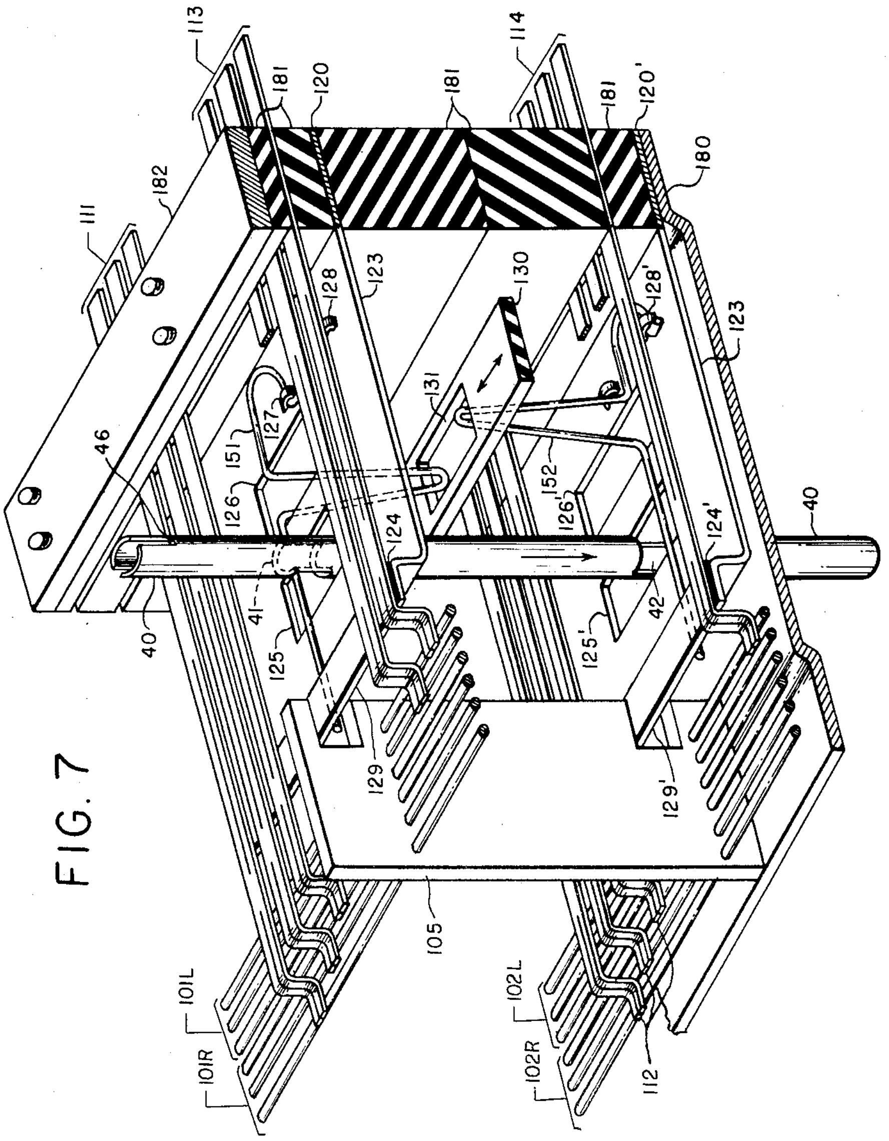
Fig. 7 shows a partial sectioned view of a cross-point and the mechanism individual thereto.
Figure 8:
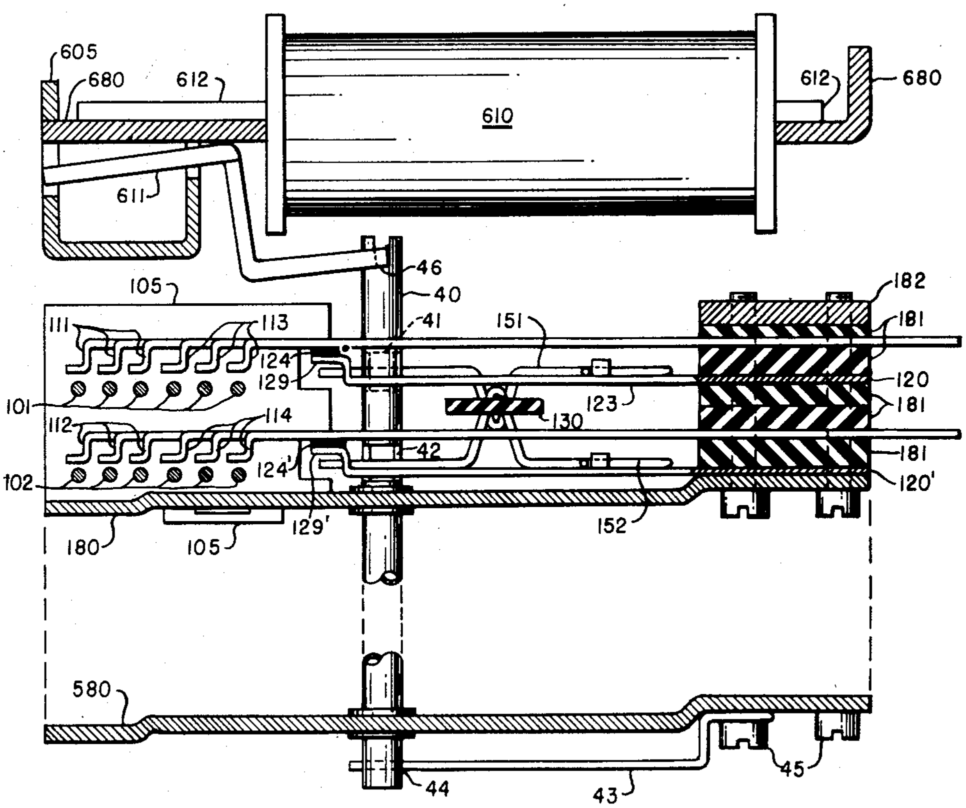
Fig. 8 is a sectional view of the vertical or cross operating mechanism.

Each of the levels such as 10 are identical in construction to the one shown in detail in Figs. 2, 7 and 8. Referring more particularly to Fig. 2, it is seen that the movement with the level is generated by one of the horizontal relays 160 or 170. Construction details of these relays are shown in Figs. 9–13. A relay such as 170 consists of a coil 174 mounted inside an open end rectangular shaped heelpiece 173. Also secured to the heelpiece is a formed armature holder 175 shown in Figs.

Figure 9:
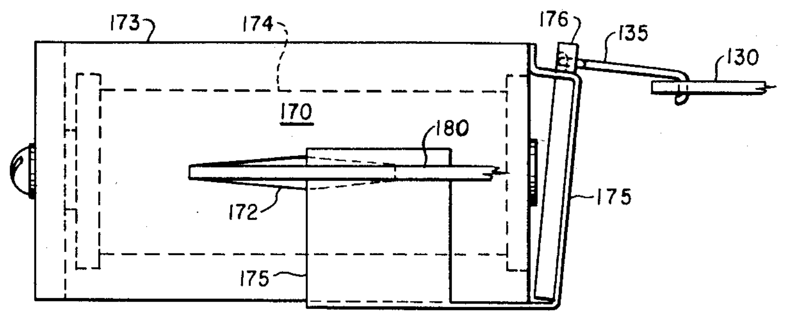
Figs. 9, 10, 11, 12 and 13 show the details of construction of the horizontal relay mechanism.
Figure 10:
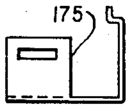
Figure 11:
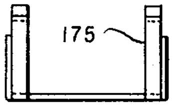
Figure 12:
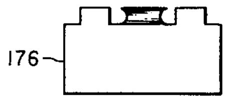
Figure 13:
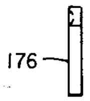
Figure 14:
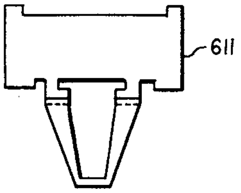
Figs. 14 and 15 show the armature of a vertical actuating relay.
Figure 15:
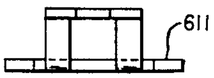

9–11. This holder may be of some material such as Phosphor bronze which has spring-like characteristics. Fitted between the holder 175 and the core of coil 174 is the armature 176. The armature thereby provides the fourth side to complete the rectangle of the heelpiece 173. The armature is confined into the open end of the rectangle by the upper arms of the holder 175. The armature is held against the coil core and heelpiece at the lower edge of the armature and its upper edge is free to pivot against or away from the core of coil 174. The heelpiece as shown in Fig. 9 has a side slot 172 which serves to mate with slight shoulders 185 in the sides of a cutout in the end of base plate 180. By means of a press fit, the heelpiece is permanently secured to the base plate in the associated cutout. When the heelpiece is to be removed from the base, the free ends of the heelpiece (armature end) are squeezed together such that the shoulders are freed from the slot. The heelpiece may then be removed and replaced.

Figure 3:
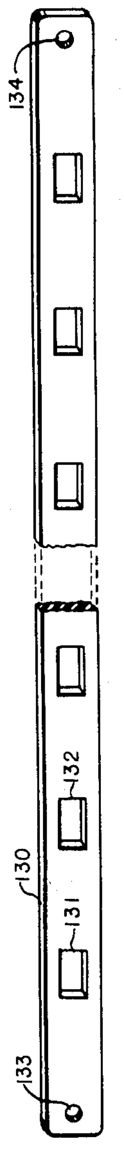
Fig. 3 shows the horizontal actuating ribbon.

A relay similar to that described is placed with its armature end inward at each of the ends of the level as shown in Fig. 2. A flexible ribbon 130 made of any suitable material such as stainless steel or linen Bakelite is attached to both relays 160 and 170 by means of connect wires such as 135 and 136. Wire 135 has a loop which slips over the middle shoulder of armature 176 and a hook which slips into hole 133 of ribbon 130. Wire 136 is connected to the armature of relay 160 and the opposite end ribbonhole 134. Thus, when both wires are connected, both armatures are held in the normal position biased away from their respective coil cores. Ribbon 130 has along its length ten equally spaced apertures such as 131, 132, etc. The ribbon 130 and its apertures 131 are shown in detail in Figs. 2, 3 and 7.

Also mounted in base plate 180 is the pileup as shown in cross section in Figs. 7 and 8 comprising two somewhat identical tiers. This pileup consists of lower release plate 120′, insulator 181, six horizontally aligned contactors in sets 112 and 114, insulator 181, upper release plate 120, insulator 181, contactor sets 111 and 113, insulator 181 and upper retaining plate 182. This pileup transversely covers most of the length of the base plate 180 as shown in Fig. 2.

Figure 16:
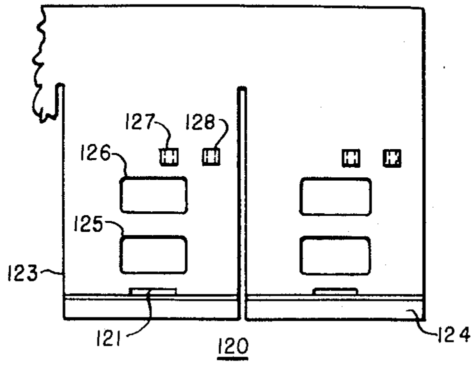
Figs. 16 and 17 show a top and side view of the contactor release plate.
Figure 17:
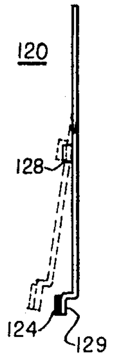

Release plates 120 and 120′ are identical to one another in construction and serve a like purpose. Two of each of these plates are required per level. These plates, a representative section of which is shown in Figs. 16 and 17, consist of a single plate which has been blanked and formed as shown. The plate 120 as shown is divided into five equal size cantilevered sections such as 123 which retain the common connection at the rear to the main plate. This arrangement provides for a simple assembly since, of course, the alignment and positioning of a single piece is faster than the assembly of five pieces. The plates 120 and 120′ are made of a resilient metal such as nickel silver.

The sections such as 123 each have formed at the free extremity a lip 129 as shown in Fig. 17. An insulator 124 is then fastened to the lip in some suitable manner. Each section is tensioned in the manner shown by the dotted lines of Fig. 17. Perforated into each section are cutouts 125 and 126. V-grooves 127 and 128 are notched into each section also.

Each plate section such as 123 has connected to it one end of a wire release spring of the type shown in Figs. 5 and 6. The spring 152 specifically shown in Fig. 6 has its mid-section formed to project upward, while spring 151 (shown in Fig. 7) has its mid-section formed to project downward. Otherwise these springs are identical and can be fabricated from wire such as music wire.

A spring such as 151 is laced through the V-groove or embossing 127 on the release plate section 120 as shown in Fig. 7. This spring is formed with a crook end and the main body of the spring in one plane and an angled mid-section in a plane perpendicular to the plane of the main body. The angled mid-section of the spring therefore extends downward through the cutout 126 in the plate section and reaches through ribbon 130 at the left side of aperture 131. The planar body of the release spring extends along the free end of the release plate section and under the lip 129.

For the lower tier movement, a spring 152 which, as mentioned previously, is generally identical in shape to spring 151 with the one exception that the angled mid-section is at an 180° angle to the mid-section of spring 151. This spring is laced through the V-groove corresponding in position to 128 of Fig. 16. The angled mid-section therefore extends upward through the right side of aperture 131 of ribbon 130. The free end of the spring extends under the lip of the plate 120′ through slot 121.

In each of the level pileups are two layers of contactor springs. Each layer consists of two sets of contactors per release plate section. These contactors are of the type shown generally in the cited Graybill case having bifurcated tips, the tips being offset a distance from the body of the contactor. Each set of contactors such as 111 and 113 (which are the upper level contactors of Figs. 7 and 8 and as shown in top view of Fig. 2) consists of three contactors of diverse length. The three contactors of set 111 are of greater length than those of 113 such that the tips of each of the individual contactors of a set are positioned above a separate one of the six wires of the upper bank multiple 101 for the #1 level. In a similar manner, each of the contactors of the lower layer 112 and 114 are positioned above a wire of the lower bank multiple 102 of the #1 level.

The means for actually causing the contractors to move is a notched rod such as 40 shown in Figs. 1, 7 and 8. Each of these rods as shown in Fig. 1 is directly operated by the armature of one of the cross connecting relays such as 610. A series of ten of these relays is positioned on the top plate 680 as shown representatively in Figs. 1 and 4. Each of the vertical relays such as 610, of Fig. 8 has its coil wound around sections of the base plate 680 and as many shim plates such as 612 as are required. An armature 611 is mounted loosely into the space provided by the clamping plate 605 and the coil center section, or strip. Each of the armatures such as 611 is free to pivot about its line of tangency to the base plate 680 thus forcing the end butted into the slot 46 of rod 40 in a downward direction on energization of the coil. The rod 40 has a series of radial notches spaced along its length. Each of the notches being at a height even with the planar body of one of the wire release springs such as 151 and 152.

The bank multiple wires such as upper set 101 and lower set 102 are held in place by the insulator 105, **105*a* etc., shown in Figs. 2, 7 and 8. A series of insulating supports such as 105 are placed along the length of each level and fastened to the base plate such as 180 using fastening means as shown in the cited Graybill invention. Each insulating support has two indentations (shown in Fig. 7) into which the lip extremity 129 of release plate sections 123** fit. The release plate section will normally rest against the upper surface of the indentation as shown in Fig. 7, this surface providing a backstop for the plate section. Each layer of the bank multiple consists of six wires each capable of being contacted by one of the spring contactors.

*Operation*

As has been generally mentioned, the switch is one of 100 points with a possible odd-even selection at each point. There are vertically five levels, each level having two possible options, left or right and ten cross-connections.

In operation, the first action is the operation of one of the level relays. Of these, as mentioned there are two per level and for simplicity it will be considered that the right side relay of each level is for the odd tens digit; the left said relay, the even tens digit. Also that level 10 provides tens digits "1 and 2." Further, for simplicity it will be assumed that the cross point corresponding to 21 is required in operation. Then the operation cross point 11 will be shown.

The relay shown as 170 will operate in response to the tens digit "2." On operation, armature 176 will be drawn against the coil core drawing along with it the armature spring 135. Ribbon 130 will be drawn to the left deflecting spring 152 to the left (Fig. 7). Further, ribbon 130 draws the armature and holder of relay 160 to the left also disenabling relay 160. This is possible due to the flexibility of the armature holder. Thus relay 160 is maintained inoperable while relay 170 is operated. Spring 152 will thereby be forced into notch 42 of post 40. Springs 152*a*, 152*b*, etc. will also be forced into the corresponding notches respectively of rods adjacent them. When the units digit "1" follows, relay 610 of the cross-connect relays is actuated. Armature 611 of Fig. 8 will be drawn against base plate 68 pivoting the rod end of the armature downward. Rod 40 is then pivoted downward deflecting spring 152 downward. Wire spring 152 forces plate section 123' of plate 120' downward by pressing against the plate section upper surface. Contactors 112 and 114 normally biased downward are released by movement of section 120' downward and tactually engage respective wires in the bank wire multiple 102. Contact pressure is achieved by the normal bis of the contactors.

When the contactors have once engaged the wire multiple, they may be held engaged after release of the horizontal level relay. As soon as the crosspoint connection has been made, relay 170 is released. Armature 176 restores releasing ribbon 130. Spring 152 due to its spring tendencies is held against the upper surface of notch 42 and maintained securely. Thus plate section 123 remains in the down position and the contactors remain against the bank multiple. In this manner the switch may be utilized to provide any crosspoint connection except those requiring 1 as the units digit. Release of the connection can then be accomplished by release of relay 610.

When "11" crosspoint is required, the operation although similar to that described for "21" is as follows:

Relay 160 will be operated when the tens digit "1" is transmitted. Ribbon 130 is then drawn to the right displacing release spring 151, 151*a*, 151*b*, etc. to the right and into notch 41 and corresponding notches. For the final digit, relay 610 is operated forcing rod 40 downward. Spring 151 is forced downward also, pressing against plate section 123 of plate 120 which deflects downward, freeing contactor sets 111 and 113. The contactor sets due to their direction of tensioning make contact with bank multiple 101. Relay 100 may then be released, and the crosspoint connection retained, as explained previously.

When the crosspoint connection is to be released, cross operate relay 610 is released. Notched rod 40 is moved upward due to the action of restoring spring 43 (Fig. 8). With its move upward, spring 152 is released from notch 42 and returns toward its normal position carrying plate section 123 upward. The plate section carries the contactors out of engagement with the bank multiple.

What is claimed is:

1. In a horizontal level for a cross-bar switch, a relay mounted at each end of said level, a flexible ribbon having a plurality of equally spaced apertures, means connecting said ribbon between said relays, a pair of plates adjacent each of said apertures, contactor springs normally held in place by each of said plates, one of said plates adjacent above and one of said plates adjacent below each of said apertures, a flexible spring mounted individually to each of said plates, each of said springs having an angled section deflectably engageable horizontally with the adjacent aperture, cross operating rods having notches for receiving deflected springs, means for selectively dislocating one of said rods vertically, said dislocated rod thereupon causing any horizontally deflected springs to depress the plate to which the dislocated spring is mounted, a bare wire multiple bank adjacent said contactors, contactor springs freed by a depressed plate to tactually engage said bank multiple.

2. In a crossbar switch having a plurality of horizontal levels and vertical rows, a plurality of crosspoint contactors at each intersection of a level and a row, ladder means in each of said levels displaceable in either one of two horizontal directions, a first and a second set of flexible rods on each of said levels, said first set of rods deflectable on displacement of said ladder means in a first of said two directions, said second set of rods deflectable on displacement of said ladder means in the second of said two directions, a shaft in each of said vertical rows, notches in each of said shafts for nesting therein deflected rods, cross operating means for vertically moving a selected one of said shafts, said selected shaft on movement vertically deflecting any horizontally deflected rods nested therein, means responsive to vertical deflection of a rod to release the crosspoint contactors at the intersection of said level and row to tactually engage bank contacts.

3. In a crossbar switch having a plurality of crosspoints arrayed in a number of horizontal tiers and vertical rows, each crosspoint of said tier including a set of active contactors, each set of contactors comprising a predetermined number of coplanar, bifurcated members of graduated lengths, each successive contactor of a set having a tip colinear with the corresponding contactor tip in the other sets of said tier, a plurality of longitudinally spaced wires adjacent under said contactor tips, each of said wires adjacent under and contactable by a single contactor tip of each set, each of said contactors biased toward the wire adjacent thereto, means normally restraining each set of contactors apart from the wire adjacent thereto, means for depressing a selected one of said restraining means to free a selected set of contactors and allow the selected set of contactor tips to individually contact the adjacent wires due to the individual bias of the contactors.

4. In a crossbar switch, a plurality of sets of contacts prepared for closure, a longitudinal flat base plate, a plurality of transverse strips formed along said base plate, a plurality of horizontally mounted relays for producing vertical motion, a plurality of metallic spacers, each of said relays utilizing one of said transverse strips in conjunction with a plurality of said spacers as a coil core, each of said relays having an armature pivotally restrained against the coil core of the relay, an individual push rod slideably mounted to each of said armatures, each of said push rods having a plurality of radial notches therein, means responsive to the sliding of one of said push rods to cause one of said prepared sets of contacts to be closed.

5. In a crossbar switch, a level having a solid base plate, said level having means for optional internal movement in either of two longitudinal directions, said means including a relay at each end of said level in the longitudinal direction, each of said relays having its armature end disposed inwardly, each of said relays having an open end rectangular heelpiece open inwardly, each of said heelpieces having slots formed in the parallel sides, said solid base plate having a rectangular cutout at each longitudinal end of substantially the same area as said heelpiece, protruding shoulders on the walls of said cutout for mating with the slots of said heelpiece and thereby maintaining said relay in said level base plate.

6. In a crossbar switch having a plurality of identical horizontal levels for providing primary motion, and a plurality of cross-operating rows for providing resultant vertical motion, each of said levels having a pair of opposedly mounted relays, each of said relays having its armature linked to the armature of the opposed relay, said armature linkage comprising a ladder-like member reciprocable between said relays, said member having a separate aperture adjacent each of said rows, a pair of springs associated with each of said apertures, one of each of the pairs of springs on a selected level horizontally deflectable on reciprocal movement of the ladder member of the level in one direction, cross-operating means individual to each of said rows, notches on said cross-operating means engaged on deflection of any of said springs, a vertical relay individual to each of said rows and individually operable to depress the cross-operating means individual to said row, each of said cross-operating means on depression vertically deflecting any engaged springs, a set of release plates individual to each of said levels, each of the plates of a set individual also to a row, vertical deflection of a spring vertically displacing the plate individual to said level and row, a set of contactors individual to each of the plates and released on vertical displacement of a plate to individually contact a bare wire bank.

7. In a cross bar switch, a cross point mechanism comprising: a plurality of sets of contactors, a bare wire bank, each of said sets of contactors comprising a tier of individual contactors, each of the contactors of a tier individually poised above a separate bare wire of said bank, all of said contactors normally biased toward the wire bank, a flexible plate beneath each of said tiers of contactors normally restraining the contactors out of contact with the wires, and means for depressing one of said plates to release the restraint from the contactors of the tier normally restrained by said release plate, said released contactors thereafter each individually contacting the wire above which normally poised and toward which normally biased.

8. In a crossbar switch, a cross point mechanism comprising: an armature capable of horizontal motion in either of two longitudinal directions, an aperture in said armature, a first and a second flexible spring extending through said aperture, a first flexible plate attached to said first spring and a second plate attached to said second spring, a plurality of tiers of transverse contactors, a plurality of longitudinal wires, each of the contactors in a tier having a wire individually adjacent thereto, each of said plates individually restraining a tier of contactors from the adjacent wires, means for moving said armature in one of said two longitudinal directions, movement of said armature deflecting one of said springs, a vertical rod adjacent said aperture, means in said rod for receiving said one deflected spring, and means for depressing said rod, said rod on depression depressing said spring which in turn deflects the attached plate, depression of the attached plate releasing the tier of contactors restrained by that plate, the contactors in the released tier thereafter maintaining contact with the wires adjacent thereto.

9. In a cross bar switch, a plurality of identical horizontal levels, a first level of said plurality, an actuating member on said first level comprising a ladder-like flexible ribbon movable in either of two longitudinal directions, a first set of spring means extending transversely to said member in a plane above said member, a second set of spring means extending transversely to said member in a plane below said member, an angled midsection in each of said spring means motively contacting said member, the spring means of said first set responsive to motion of said member in a first longitudinal direction to thereby deflect, the spring means of said second set responsive to motion of said member in a longitudinal direction opposite said first directon to thereby deflect, a first tier of flexible plates, each of the plates in said tier having individually connected thereto one of the spring means of said first set, a second tier of flexible plates, each of the plates in said second tier having individually connected thereto one of the spring means of said second set, a plurality of sets of contactors, each of said contactor sets individual to one of said flexible plates, a bare wire bank having a plurality of conductors tactually adjacent said contactors, and cross-operating means motive in a direction perpendicular to the motion of said member for depressing one of said deflected springs, said depressed spring also depressing the connected flexible plate, said depressed flexible plate thereby allowing the contactors adjacent thereto to contact the bare wire bank.

10. In a crossbar switch as claimed in claim 9, said cross-operating means comprising a plurality of notched rods, the notches on each of said rods adjacent said spring means and in the path of deflection of said springs, and means for selectively depressing one of said rods to thereby depress any deflected spring adjacent said depressed rod.

References Cited in the file of this patent

UNITED STATES PATENTS

| | | |
|---|---|---|
| 1,514,850 | Goff | Nov. 11, 1924 |
| 1,551,190 | Craft | Aug. 25, 1925 |
| 2,238,458 | Waller | Apr. 15, 1941 |
| 2,549,879 | Amore | Apr. 24, 1951 |
| 2,573,889 | Boswau | Nov. 6, 1951 |
| 2,604,542 | Hersey | July 22, 1952 |

FOREIGN PATENTS

| | | |
|---|---|---|
| 1,019,213 | France | Jan. 19, 1953 |